US005884524A

United States Patent [19]

Lo

[11] Patent Number: 5,884,524

[45] Date of Patent: Mar. 23, 1999

[54] MULTI-DIRECTIONAL SWINGING MECHANISM

[75] Inventor: Szu-Wei Lo, Nan-Tou Hsien, Taiwan

[73] Assignee: Single-Tree Art Industry Co., Ltd., Taichung, Taiwan

[21] Appl. No.: 941,273

[22] Filed: Sep. 30, 1997

[51] Int. Cl.[6] .............................. F16H 21/20; F16H 21/34

[52] U.S. Cl. .................................................... 74/42; 40/414

[58] Field of Search ............................ 74/42, 43; 40/414, 40/423; 472/97

[56] References Cited

U.S. PATENT DOCUMENTS

| | | | |
|---|---|---|---|
| 1,790,654 | 2/1931 | Brumder | 74/42 |
| 2,104,764 | 1/1938 | Sanders et al. | 74/42 X |
| 2,804,777 | 9/1957 | Keer-Lawson | 74/42 |
| 2,915,311 | 12/1959 | Delano | 472/97 |
| 4,295,261 | 10/1981 | Siryj | 74/42 X |

*Primary Examiner*—Allan D. Herrman
*Attorney, Agent, or Firm*—Rosenberg, Klein & Bilker

[57] ABSTRACT

A multi-directional swinging mechanism is disclosed. Its includes a base board, a support, a rotary member, a driving member, a swinging lever, a middle board, a retaining board and an adjuster. When the driving member drives the rotary member to rotate, the middle board and the retaining board will swing forward, backward, upward and downward. At the same time, in cooperation with the adjuster, the retaining board will also swing left and right. Therefore, an article such as a toy or a decoration positioned on the retaining board can be swung in multiple directions.

2 Claims, 6 Drawing Sheets

MULTI-DIRECTIONAL SWINGING MECHANISM

BACKGROUND OF THE INVENTION

The present invention relates to a multi-directional swinging mechanism which is able to swing a toy or a decoration up and down, forward and backward and left and right.

The swinging mechanism used in the existing toy or decoration generally includes a rotary disc and a linkage assembly disposed on an eccentric position of the rotary disc. When the rotary disc is rotated, the linkage is swung back and forth along. However, such swinging movement is a two-dimensional swinging movement (up and down, forward and backward) rather than a three-dimensional one (up and down, forward and backward, left and right).

SUMMARY OF THE INVENTION

It is therefore a primary object of the present invention to provide a multi-directional swinging mechanism which is able to create multi-directional swinging effect.

It is a further object of the present invention to provide a multi-directional swinging mechanism in which the angle of the left and right swinging movement can be micro-adjusted.

The present invention can be best understood through the following description and accompanying drawings, wherein:

DETAILED DESCRIPTION OF THE PREFERRED EMBODIMENT

Figure 1:
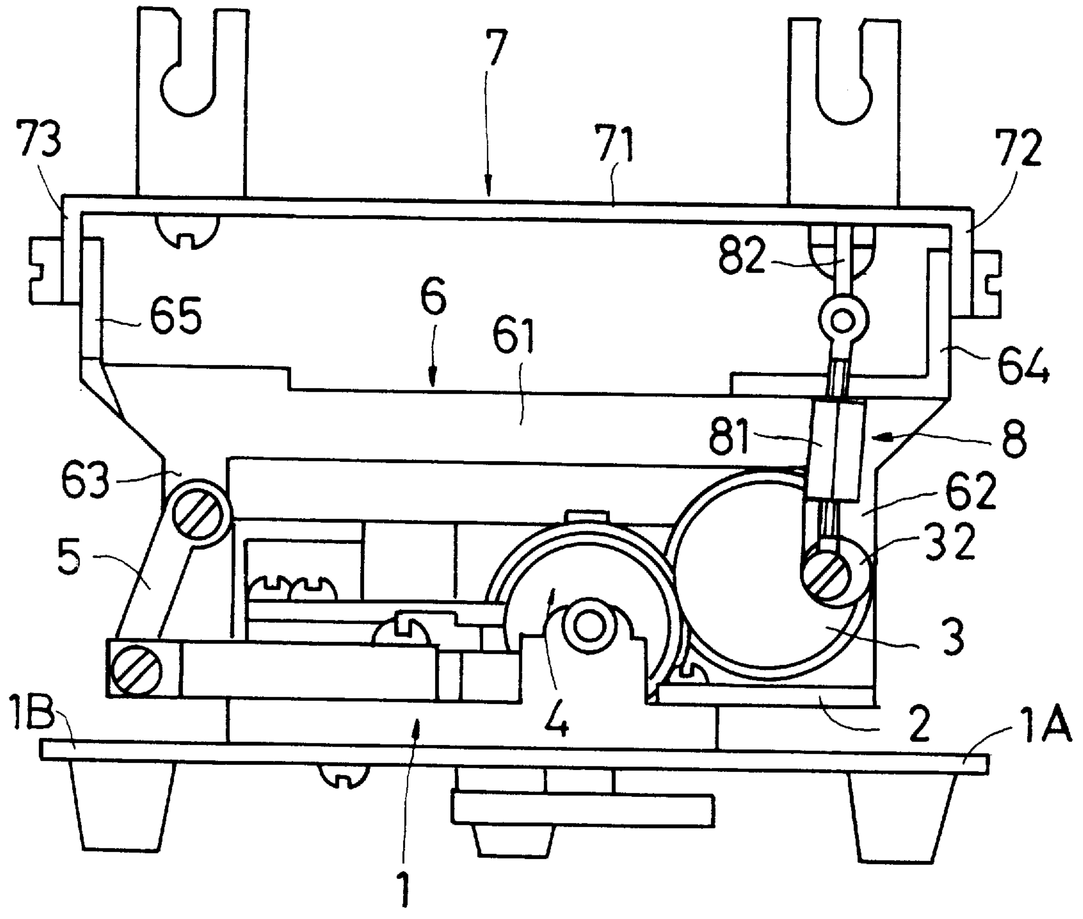
FIG. 1 is a front view of the present invention.
Figure 2:
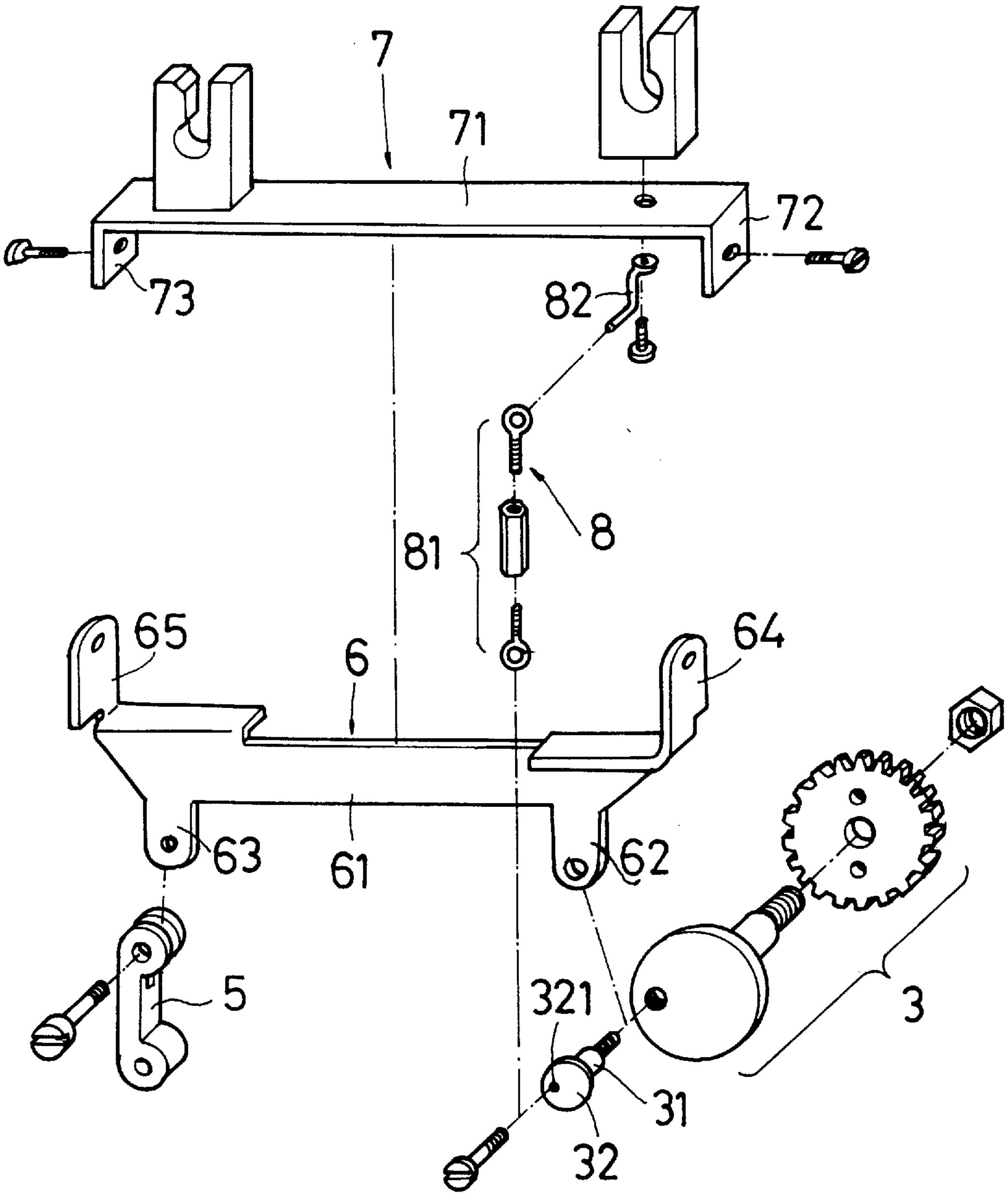
FIG. 2 is a perspective exploded view of the present invention.
Figure 3A:
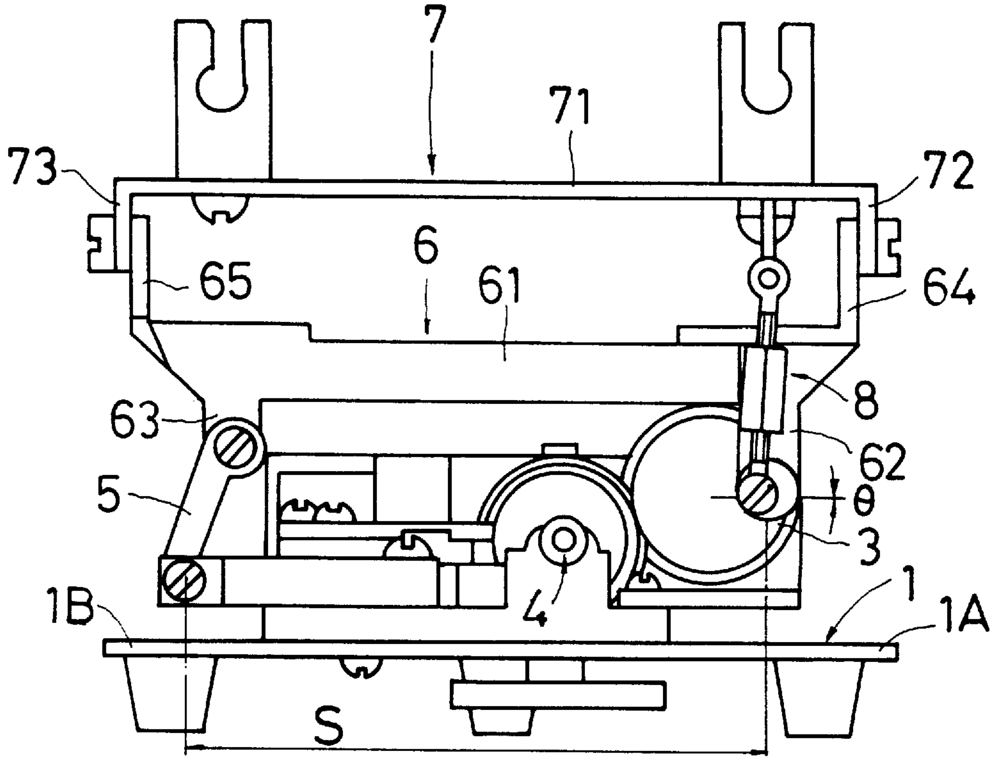
FIGS. 3A and 3B show a first state of the present invention.
Figure 3B:
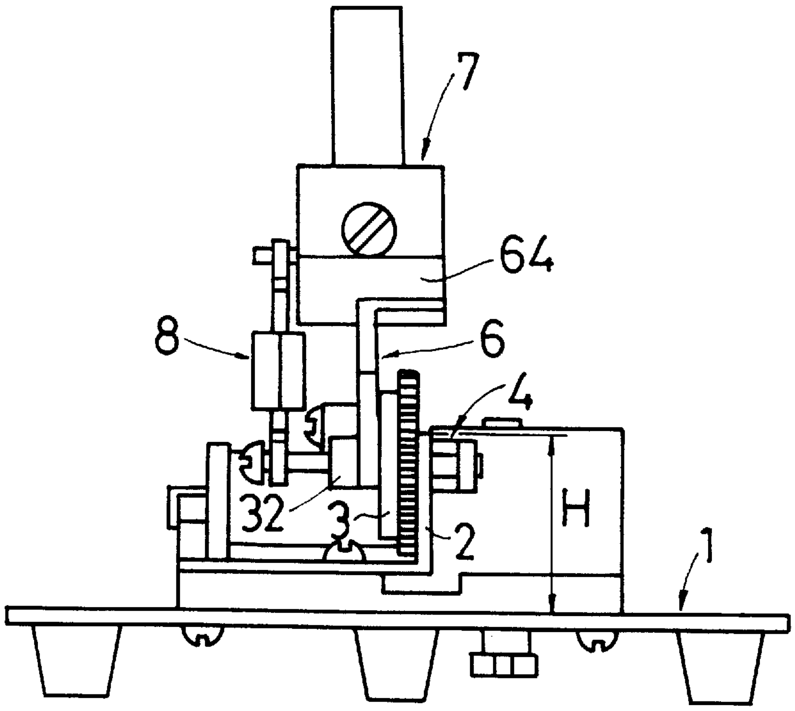

Please refer to FIGS. 1 to 2. The present invention includes a base board 1, a support 2, a rotary member 3, a driving member 4, a swinging lever 5, a middle board 6, a retaining board 7 and an adjusting means 8.

The base board 1 is disposed in a horizontal state, including a front end 1A and a rear end 1B.

The support 2 has a bottom end and a top end. The bottom end is fixed on the base board 1 near the front end 1A thereof. The top end upward extends by a predetermined height H.

The rotary member 3 is pivotally disposed at the top end of the support 2, having a horizontal pivot shaft 31 and a small circular disc 32 disposed at a rear end of the pivot shaft 31.

The driving member 4 serves to drive the rotary member 3 to rotate.

One end of the swinging lever 5 is pivotally disposed on the base board 1 near the rear end 1B thereof. The support 2 is spaced from the rotary member 3 by a predetermined distance S.

The middle board 6 has a plane section 61, a front pivot section 62, a rear pivot section 63, a front upward bent section 64 and a rear upward bent section 65. The front pivot section 62 is pivotally disposed on a first pivot shaft 31 of the rotary member 3. The rear pivot section 63 is pivotally disposed on the other end of the swinging lever 5.

The supporting board 7 has a top section 71 substantially parallel to the plane section 61 of the middle board 6, a front downward bent section 72 pivotally connected with the front upward bent section 64 and a rear downward bent section 73 pivotally connected with the rear upward bent section 65.

The adjusting means 8 includes an adjusting rod 81 and a connecting member 82 connected with top end of the adjusting rod 81. The bottom end of the adjusting rod 81 is fixed at an eccentric point 321 of the small circular disc 32.

According to the above arrangement, when the driving member 4 drives the rotary member 3 to rotate, the middle board 6 and retaining board 7 will swing forward and backward and up and down. At the same time, in cooperation with the adjusting means 8, the retaining board 7 will also swing left and right. Therefore, an article 9 (such as a toy, a decoration, etc.) positioned on the retaining board can swing in multiple directions.

Please refer to FIGS. 3 to 6 which show the operation of the present invention. First, referring to FIGS. 3A and 3B, in the case that the rotary angle (θ) is zero, the middle board 6 and the retaining board 7 are both in a substantially horizontal initial state.

Figure 4A:
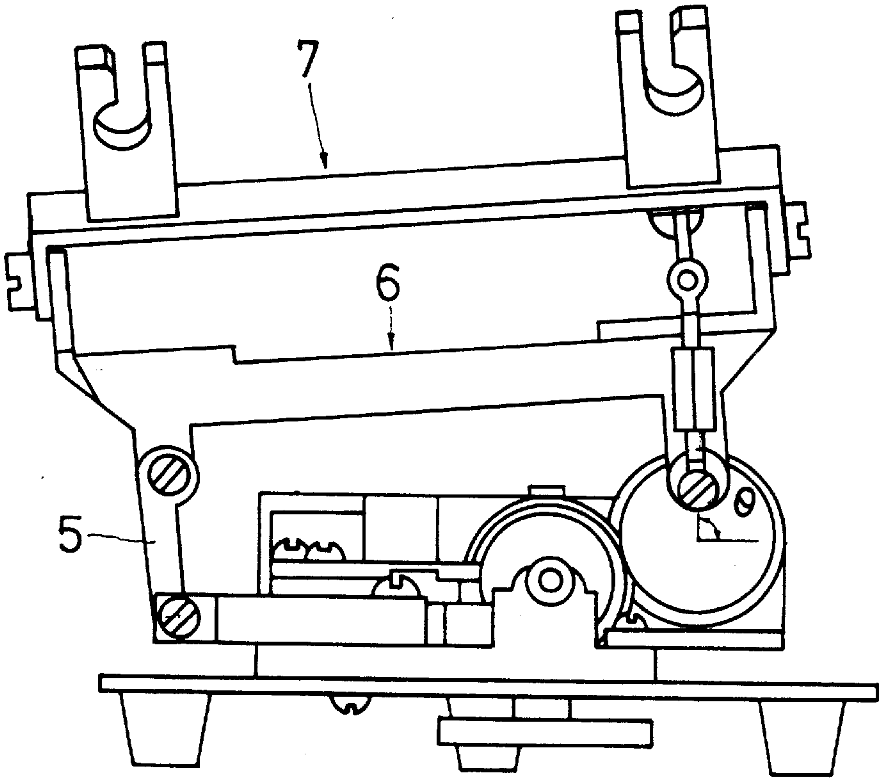
FIGS. 4A and 4B show a second state of the present invention.
Figure 4B:
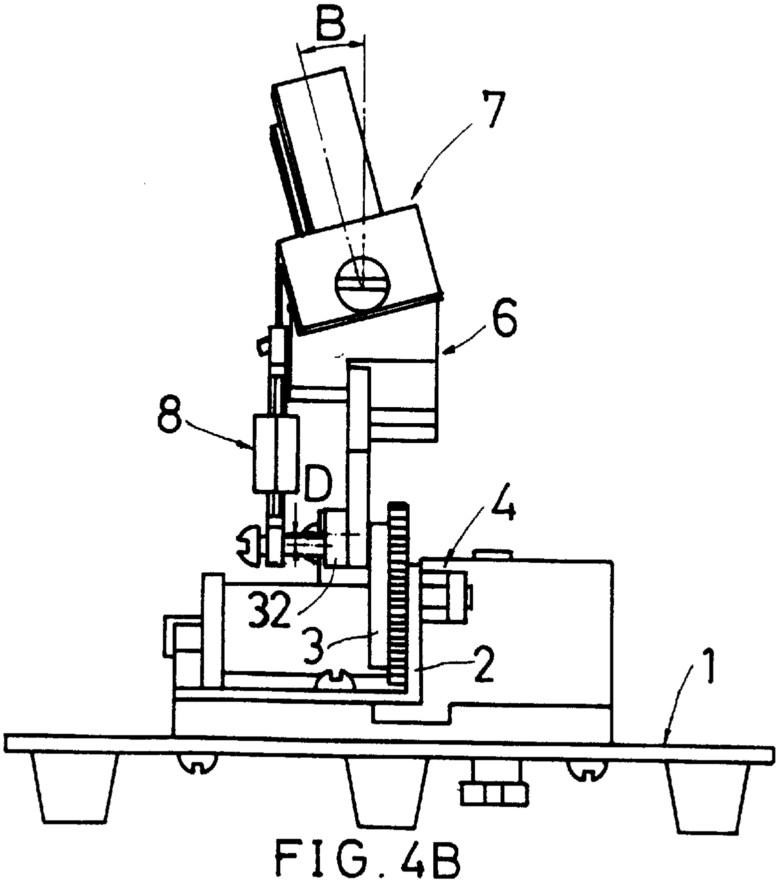

Then, the driving member 4 continuously drives the rotary member 3 to increase the rotary angle (θ) thereof. Referring to FIGS. 4A and 4B, in the case that the rotary angle (θ) is 90 degrees, the retaining board 6 is swung backward and upward. At this time, as shown in FIG. 4B, a normal distance (D) exists between the axis of the horizontal pivot shaft 31 and the eccentric point 321 of the circular disc 32, so that the adjusting means 8 will deflect the retaining board 7 by a deflection angle (β).

Figure 5A:
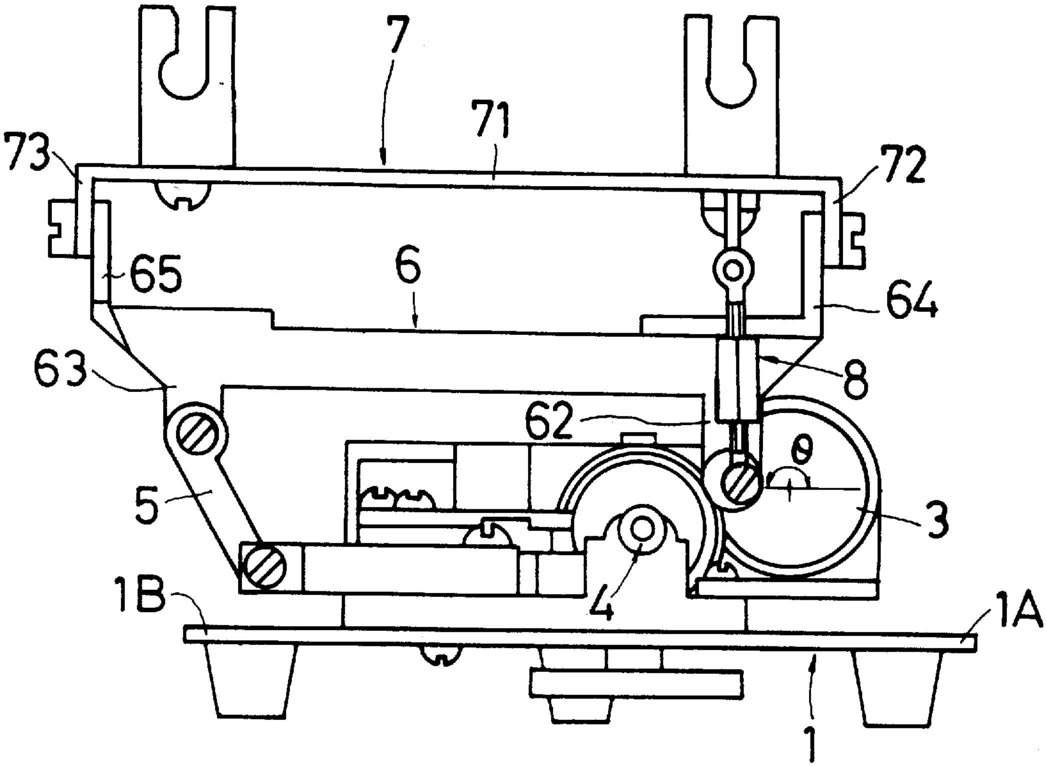
FIGS. 5A and 5B show a third state of the present invention.
Figure 5B:
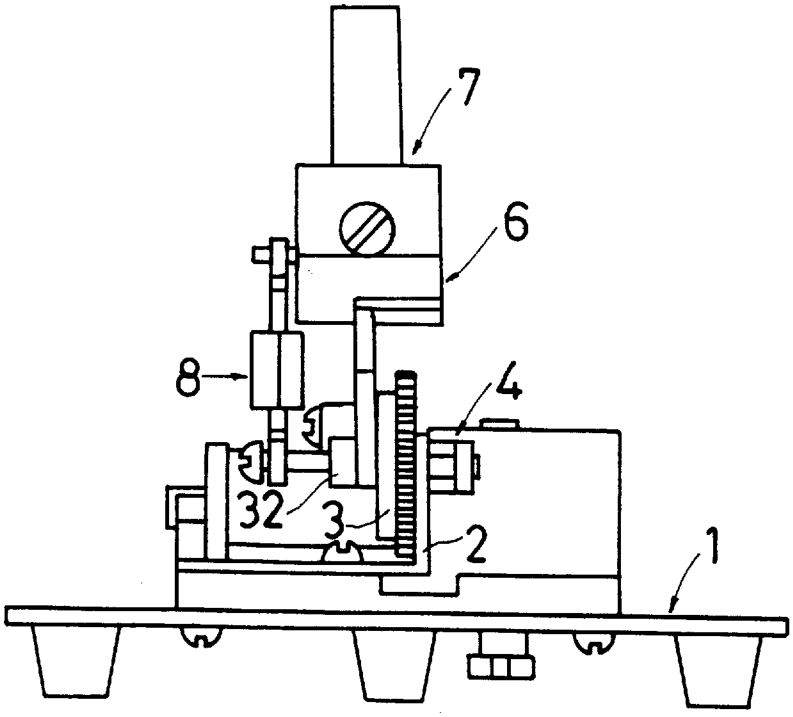

Thereafter, referring to FIGS. 5A and 5B, in the case that the rotary angle (θ) is 180 degrees, the retaining board 6 is in a substantially horizontal final state. At this time, the normal distance (D) between the axis of the horizontal pivot shaft 31 and the eccentric point 321 is about zero, so that via the adjusting means 8, the retaining board 7 is restored to its home state without deflection.

Figure 6A:
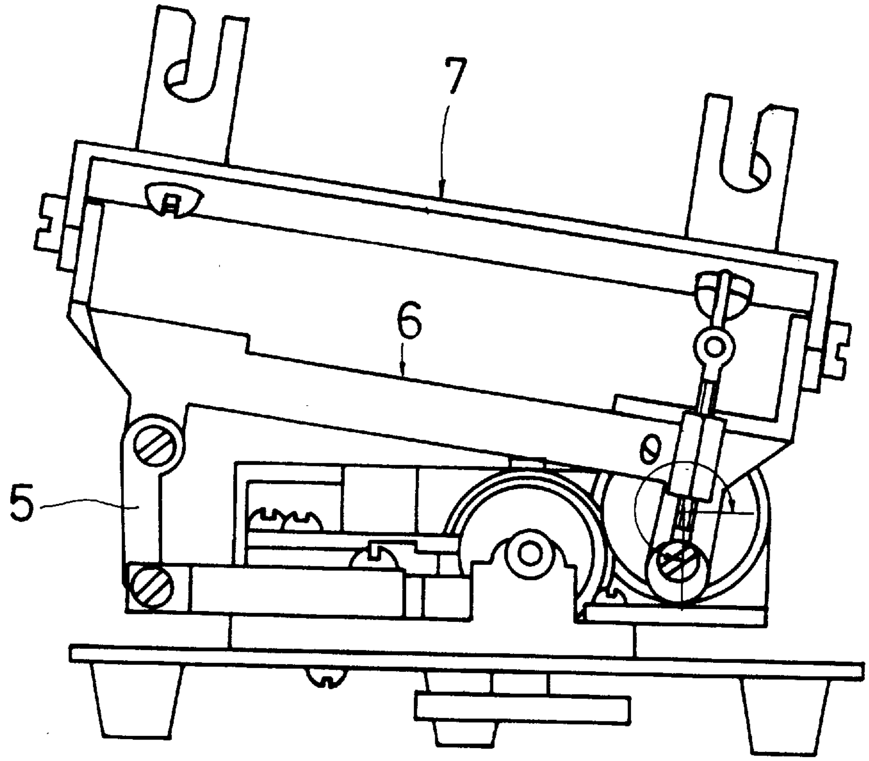
FIGS. 6A and 6B show a fourth state of the present invention.
Figure 6B:
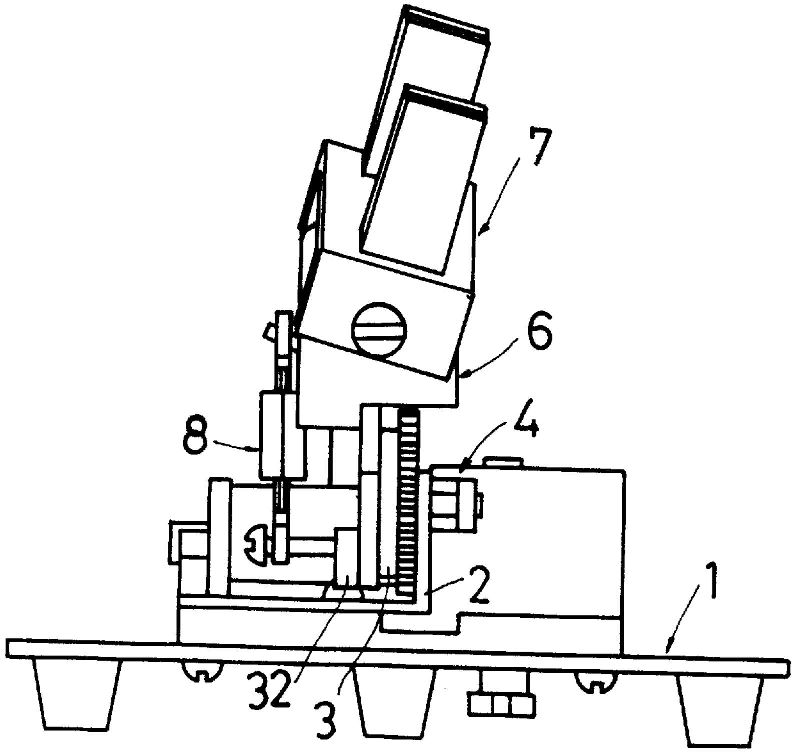

Finally, referring to FIGS. 6A and 6B, in the case that the rotary angle (θ) is 270 degrees, the front upward bent section 64 of the retaining board 6 is moved downward and forward. At this time, a normal distance (D) again exists between the axis of the horizontal pivot shaft 31 and the eccentric point 321, so that the adjusting means 8 will deflect the retaining board 7 to the other side.

Accordingly, a multi-directional swinging movement can be achieved. The above arrangement can be modified as necessary. For example, the length of the adjusting means 8 can be micro-adjusted so as to adjust the angle of the left and right swinging movement. In addition, the shape of the rotating member 3 can be modified as a oval, oblong, or rod-like one.

It is to be understood that the above description and drawings are only used for illustrating one embodiment of the present invention, not intended to limit the scope thereof. Any variation and derivation from the above description and drawings should be included in the scope of the present invention.

What is claimed is:

1. A multi-directional swinging mechanism comprising: a base board disposed in a substantially horizontal state, including a front end and a rear end;

a support having a bottom end and a top end, the bottom end being fixed on the base board near the front end thereof, the top end of the support upward extending by a predetermined height;

a rotary member pivotally disposed at the top end of the support, having a horizontal pivot shaft and a small circular disc disposed at a rear end of the pivot shaft;

a driving member for driving the rotary member to rotate;

a swinging lever one end of which is pivotally disposed on the base board near the rear end thereof, the support being spaced from the rotary member by a predetermined distance;

a middle board having a plane section, a front pivot section, a rear pivot section, a front upward bent section and a rear upward bent section, the front pivot section being pivotally disposed on a first pivot shaft of the rotary member, the rear pivot section being pivotally disposed on the other end of the swinging lever;

a supporting board having a top section substantially parallel to the plane section of the middle board, a front downward bent section pivotally connected with the front upward bent section and a rear downward bent section pivotally connected with the rear upward bent section; and an adjusting means including an adjusting rod and a connecting member connected with top end of the adjusting rod, a bottom end of the adjusting rod being fixed at an eccentric point of the small circular disc.

2. A multi-directional swinging mechanism as claimed in claim 1, wherein the length of the adjusting means is micro-adjustable so as to adjust the angle of the left and right swinging movement.

* * * * *